March 3, 1931. E. R. SMITH ET AL 1,794,424
WORK FEEDING AND REMOVING MECHANISM FOR MACHINE TOOLS
Filed July 19, 1928 9 Sheets-Sheet 7
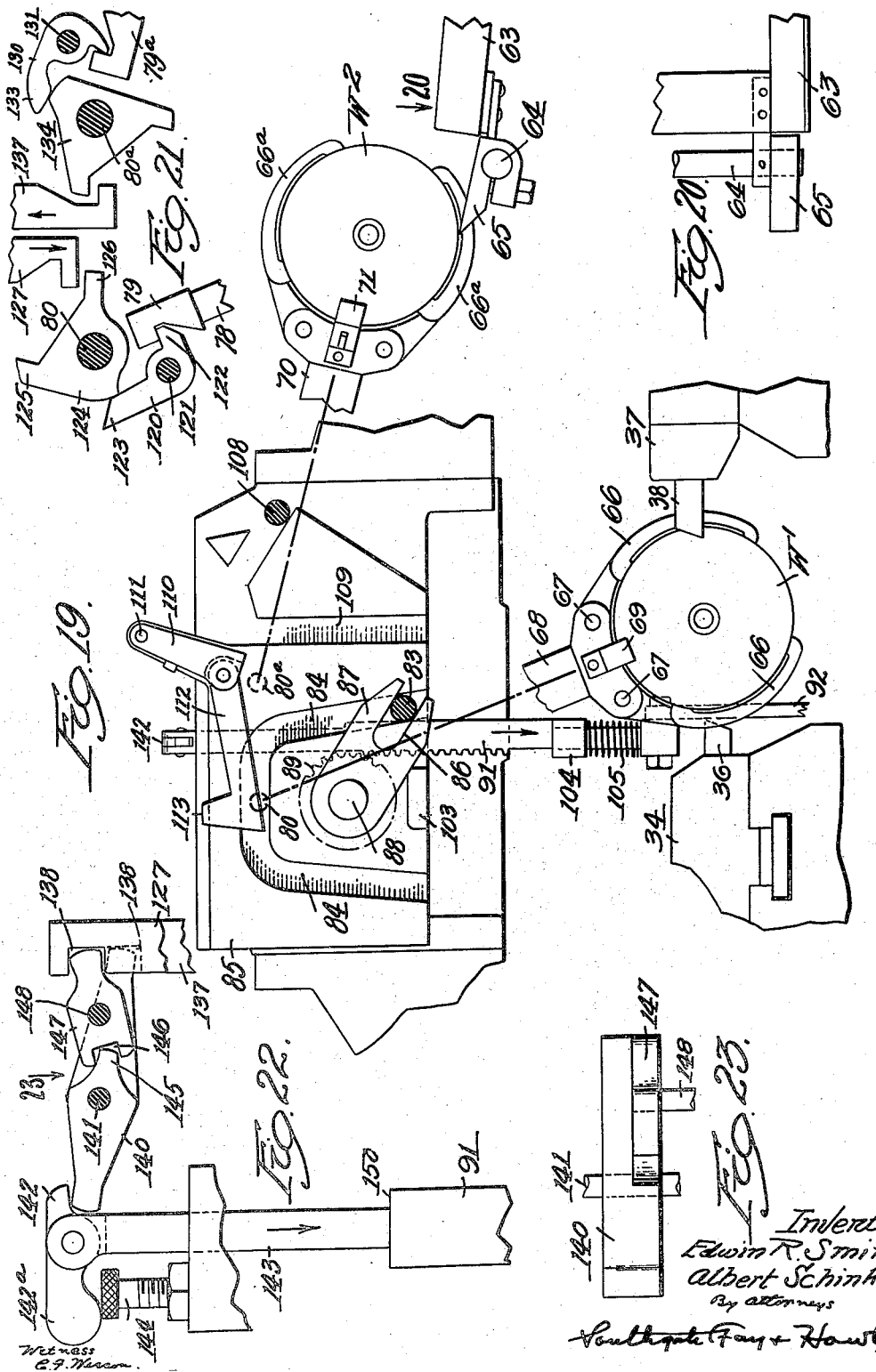

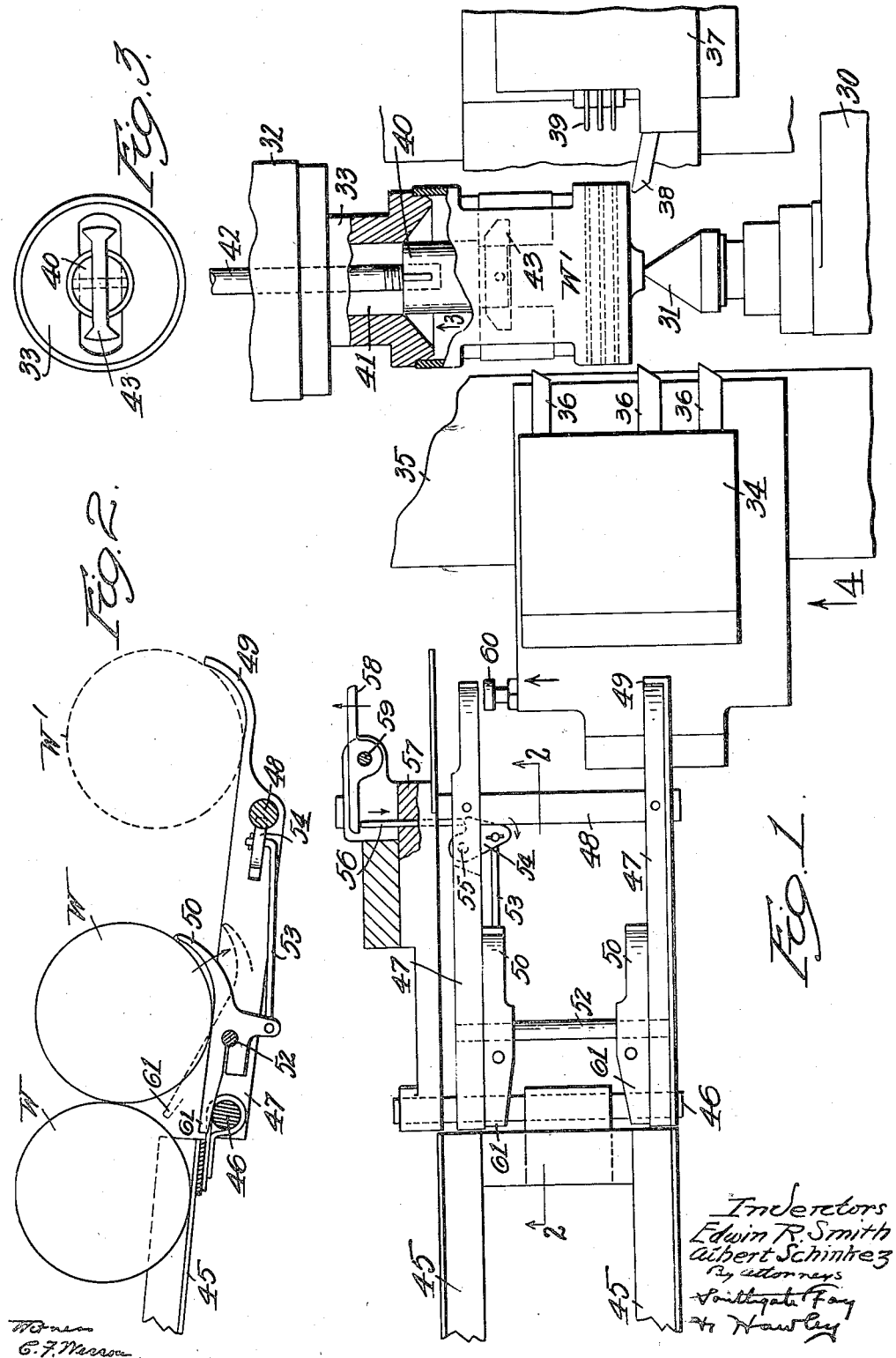

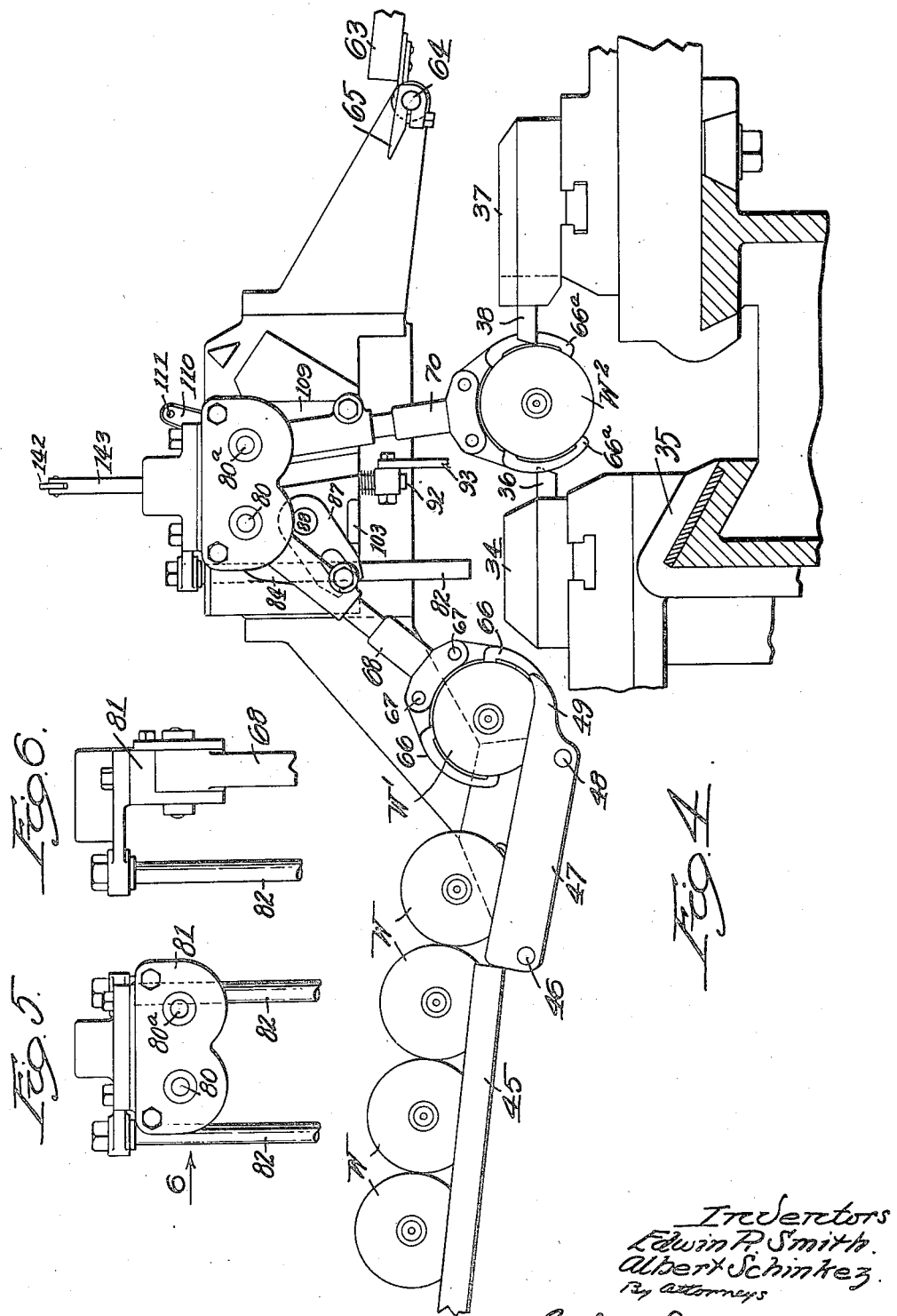

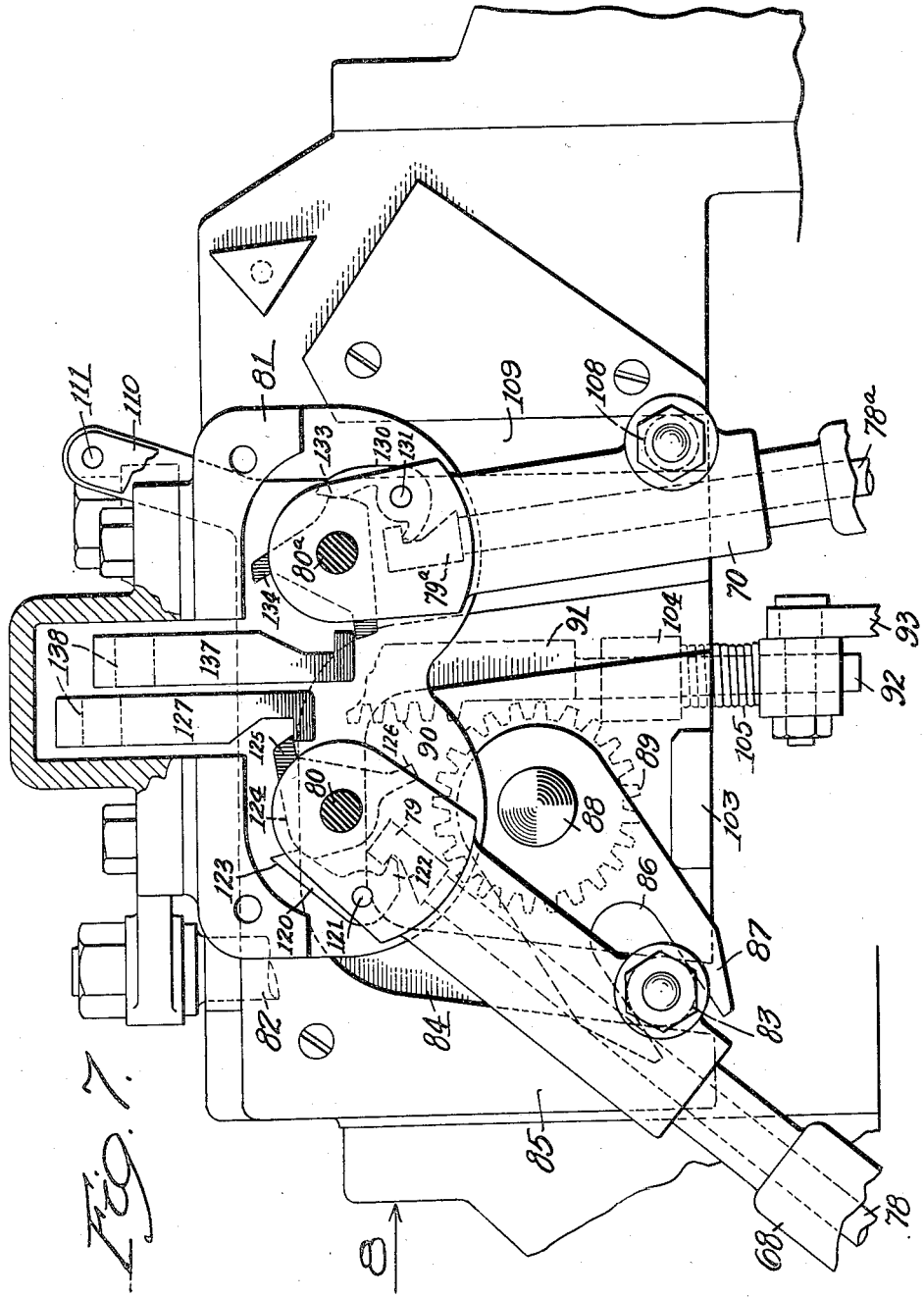

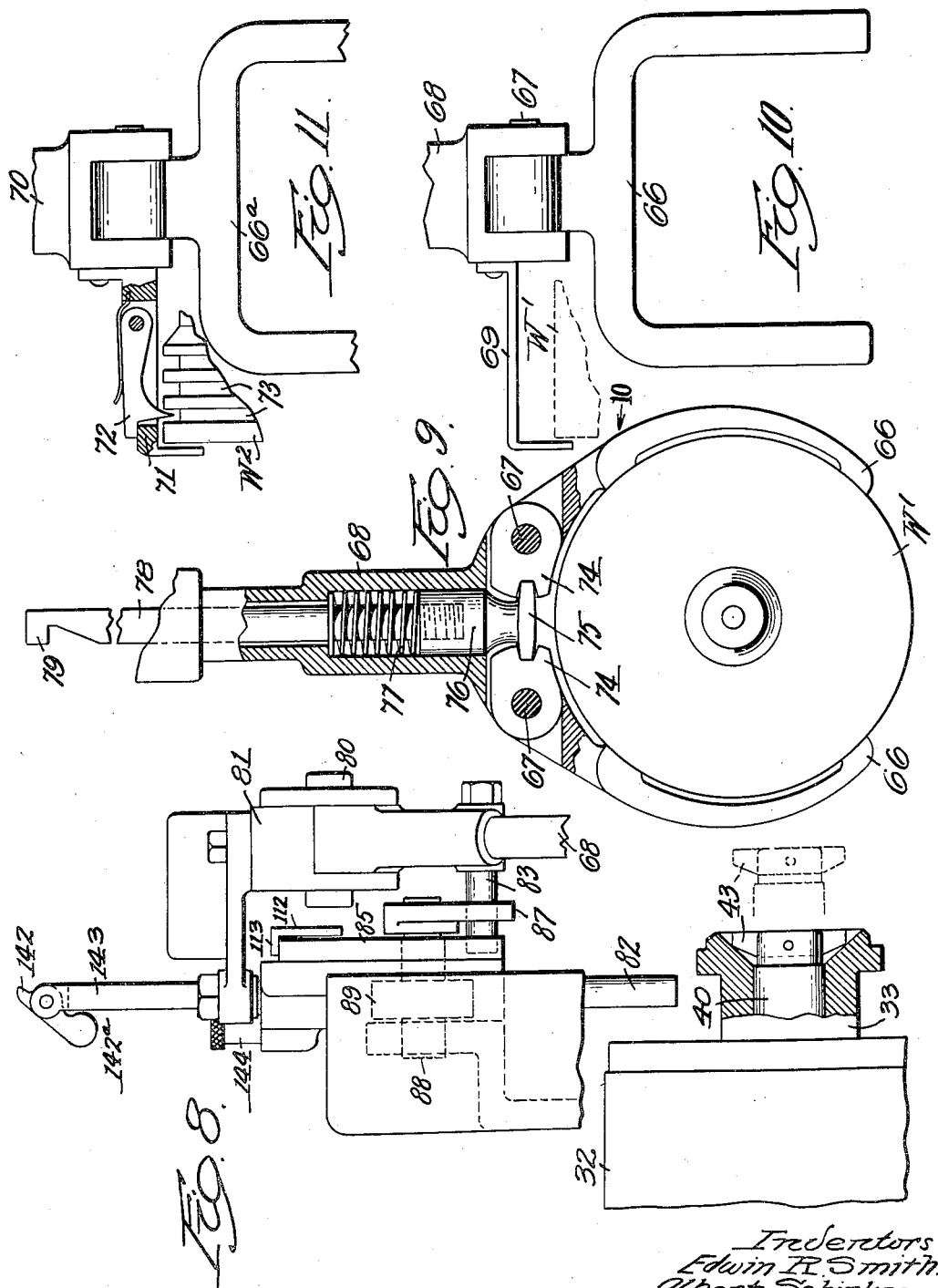

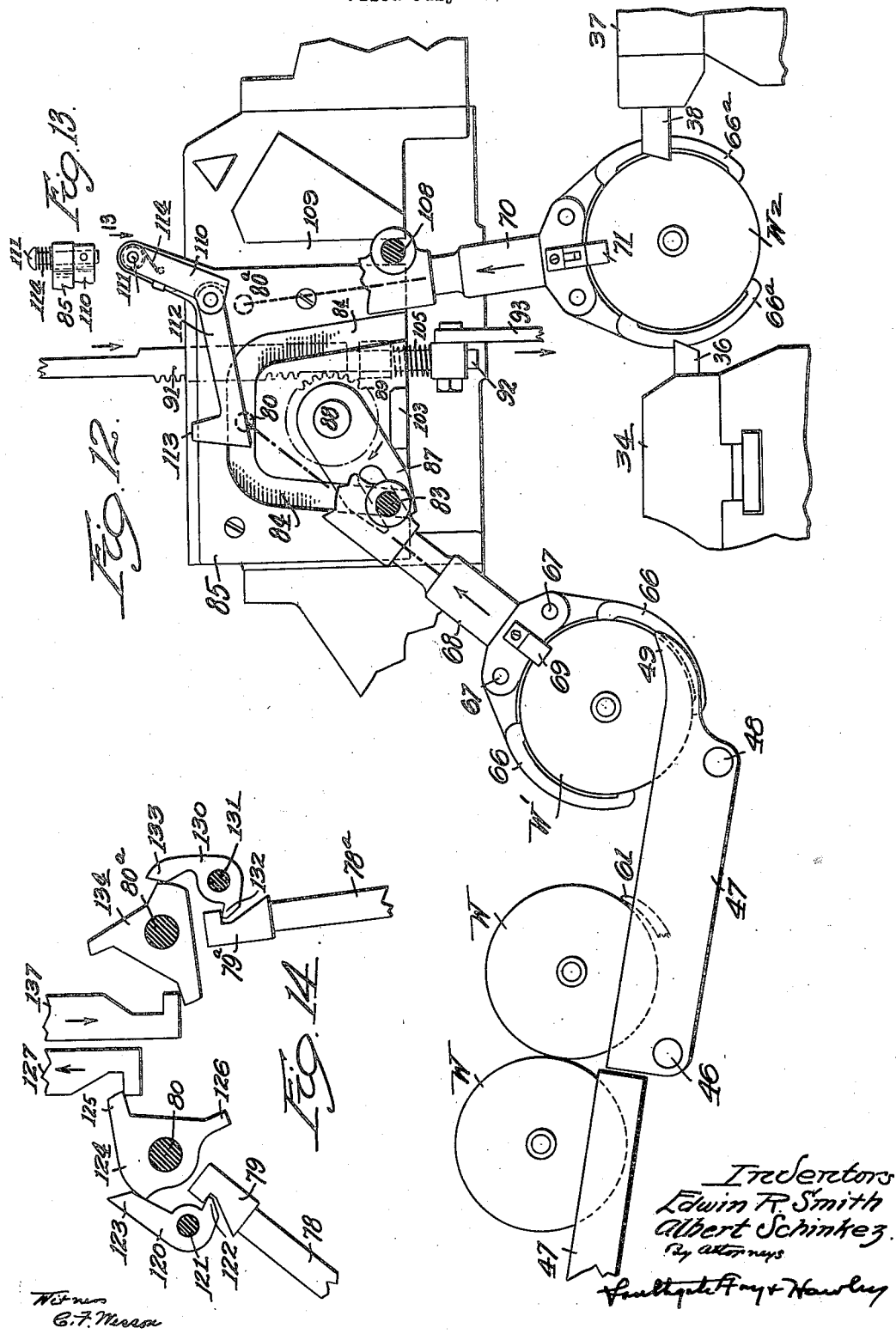

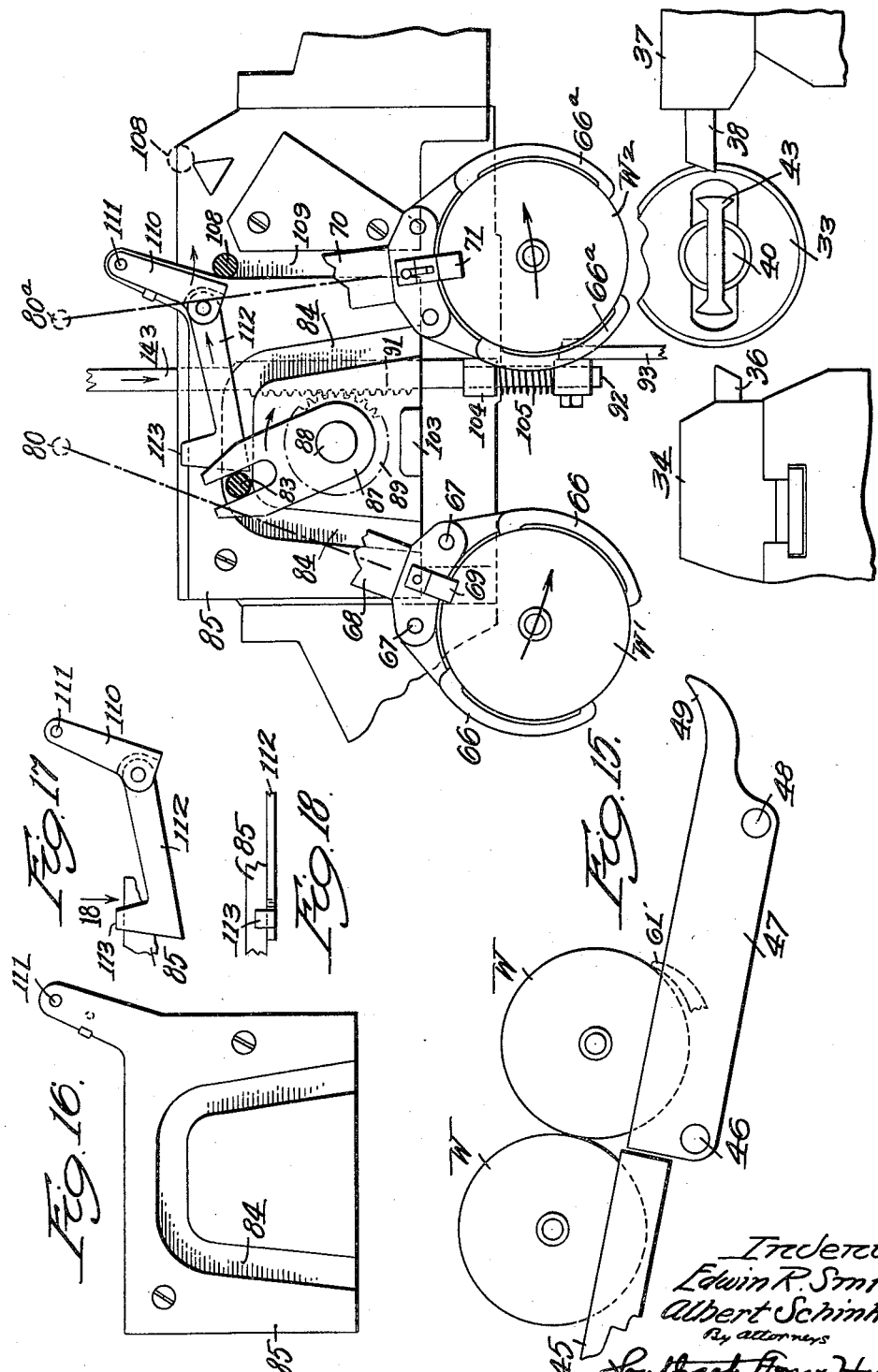

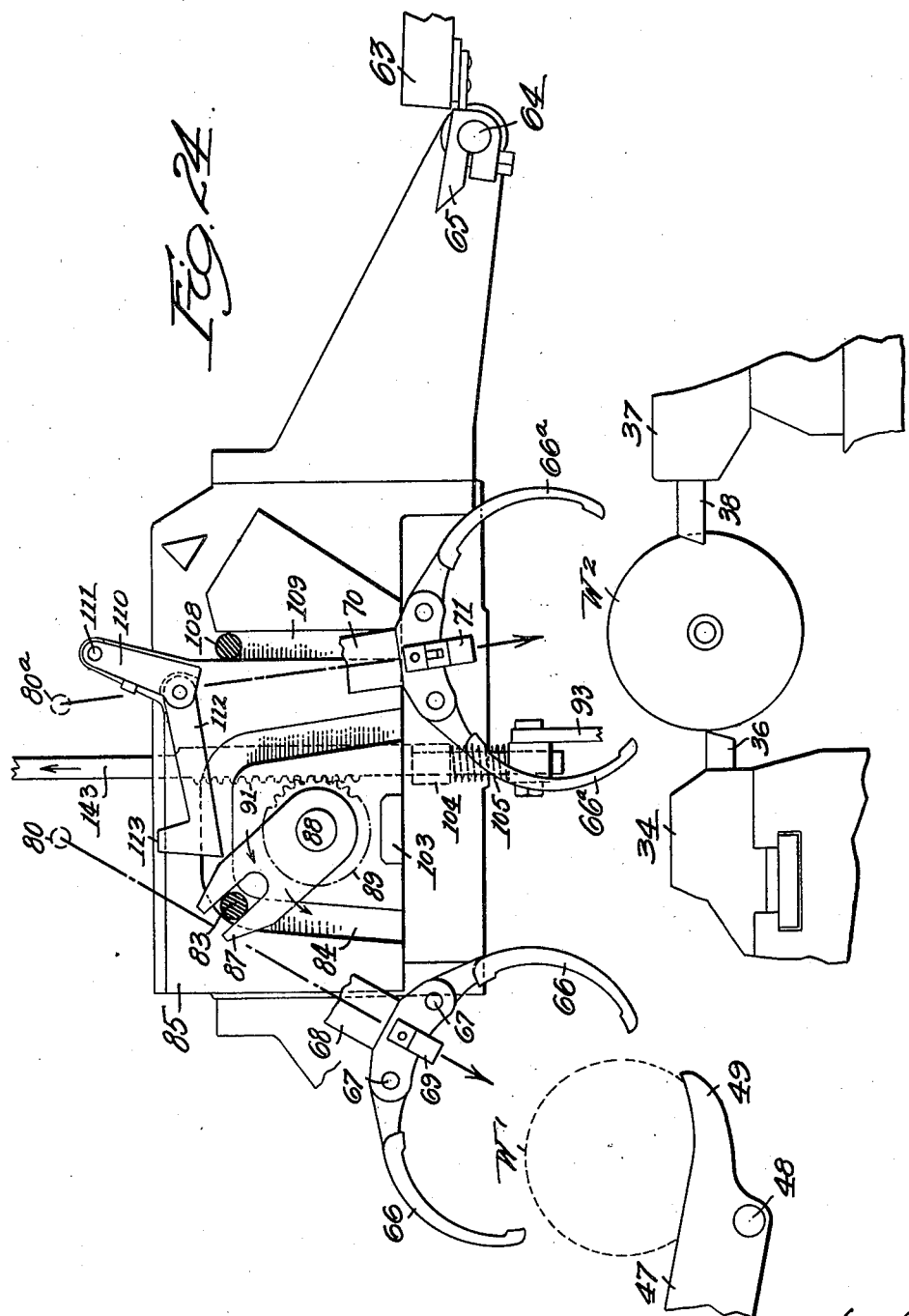

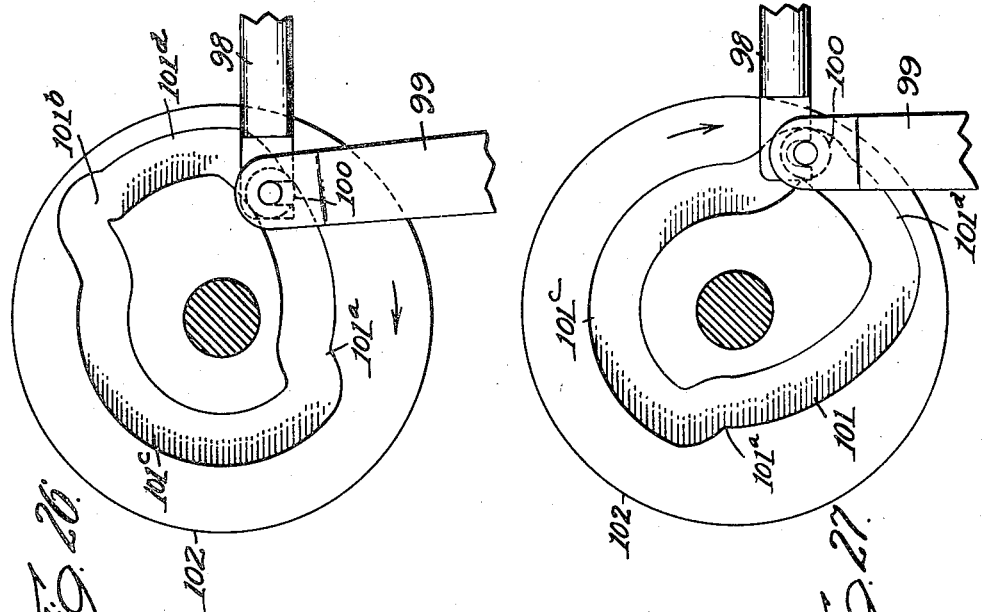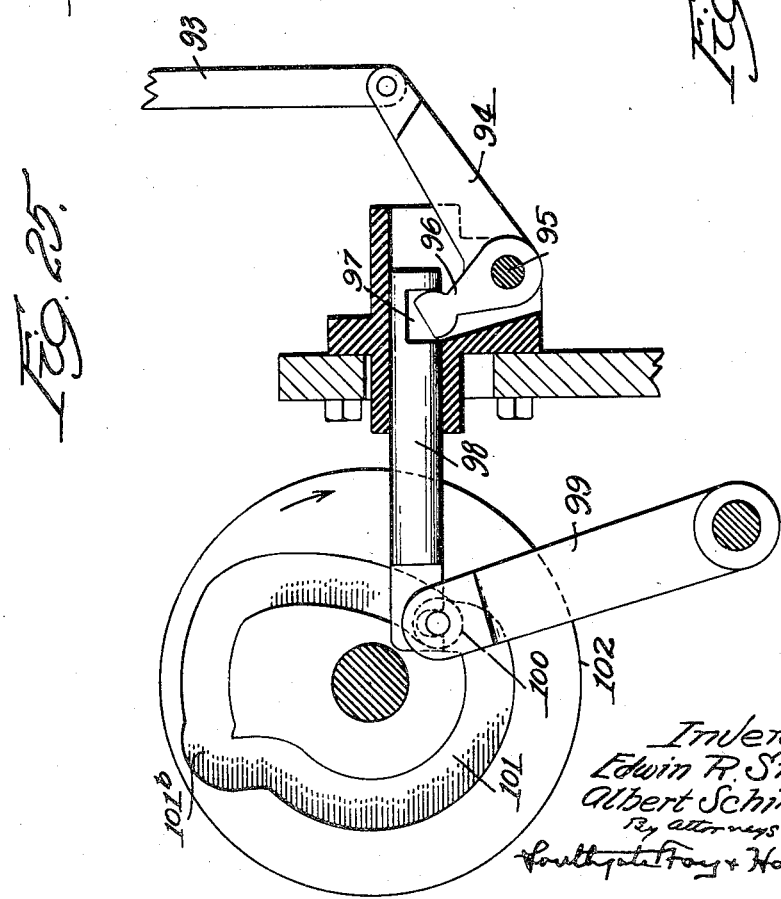

Patented Mar. 3, 1931

1,794,424

UNITED STATES PATENT OFFICE

EDWIN R. SMITH AND ALBERT SCHINKEZ, OF SENECA FALLS, NEW YORK, ASSIGNORS TO SENECA FALLS MACHINE CO., OF SENECA FALLS, NEW YORK, A CORPORATION OF MASSACHUSETTS

WORK FEEDING AND REMOVING MECHANISM FOR MACHINE TOOLS

Application filed July 19, 1928. Serial No. 294,005.

This invention relates to means for feeding and removing work in a lathe, grinding machine, or other similar machine tool.

It is the general object of our invention to provide work-feeding means operating in such a manner that the work feed and removal will not interfere with the operation of the machine tools, even when positioned to operate on opposite sides of the work at the same time.

A more specific object is to provide means for feeding and removing work by movements in substantially the same plane and preferably in reverse directions in said plane.

In the preferred form, the work is inserted from above by a substantially vertical downward movement and is removed by a substantially vertical upward movement after the machine operations thereon are completed.

Our invention further relates to arrangements and combinations of parts which will be hereinafter described and more particularly pointed out in the appended claims.

A preferred form of the invention is shown in the drawings in which

Fig. 1 is a plan view of a portion of a lathe, with parts of our improved feeding mechanism assembled therewith;

Fig. 2 is a sectional elevation of the supply or storage mechanism, taken along the line 2—2 in Fig. 1;

Fig. 3 is a detail and elevation of the work driver, looking in the direction of the arrow 3 in Fig. 1;

Fig. 4 is a front elevation of the feeding and removing mechanism at the beginning of the work movement;

Fig. 5 is a detail front elevation of a supporting frame member, to be described;

Fig. 6 is a side elevation thereof, looking in the direction of the arrow 6 in Fig. 5;

Fig. 7 is an enlarged front elevation of the operating mechanism, with certain parts shown in section;

Fig. 8 is a side elevation of the same parts, looking in the direction of the arrow 8 in Fig. 7;

Fig. 9 is a front elevation, partly in section, of one of the gripper holders;

Fig. 10 is a side elevation of one of the feeding grippers, looking in the direction of the arrow 10 in Fig. 9;

Fig. 11 is a similar side elevation of one of the work-removing grippers and parts associated therewith;

Fig. 12 is an enlarged front elevation of the feeding and removing mechanism, with the cover plate removed and with the parts in the position shown in Fig. 4;

Fig. 13 is a detail plan view, looking in the direction of the arrow 13 in Fig. 12;

Fig. 14 is a detail side elevation of the gripper locking mechanism, in a position corresponding to Fig. 12;

Fig. 15 is an enlarged front elevation of the feeding and removing mechanism, in a second or raised intermediate position;

Fig. 16 is a front elevation of a cam plate;

Fig. 17 is a front elevation of certain actuating parts;

Fig. 18 is a detail plan view, looking in the direction of the arrow 18 in Fig. 17;

Fig. 19 is an enlarged front elevation, showing the parts in a third or lowered releasing position;

Fig. 20 is a detail plan view, looking in the direction of the arrow 20 in Fig. 19;

Fig. 21 is a view similar to Fig. 14, but showing the parts ready to unlock the grippers;

Fig. 22 is a side elevation of certain actuating mechanism to be described;

Fig. 23 is a detail plan view, looking in the direction of the arrow 23 in Fig. 22;

Fig. 24 is an enlarged front elevation, showing the feeding mechanism in a normal, inoperative, intermediate position;

Fig. 25 is a side elevation, partly in section, of the cam mechanism for operating the work-feeding and removing devices; and Figs. 26 and 27 show additional operative positions of the cam mechanism.

Referring particularly to Fig. 1, we have shown our invention embodied in a lathe for turning gas engine pistons. The machine is shown as provided with a tail stock 30 supporting a tail center 31, a head stock 32 supporting a work driving spindle 33, and a front tool slide 34 movable axially of the lathe with a carriage 35, and provided with a plurality of tools 36 adapted to successively engage the work. We also provide a rear tool slide 37 having a squaring off tool 38 and grooving tools 39 mounted therein.

The work is centered on the outside of the end of the work spindle 33 and is rotated by a driver 40 (Figs. 3 and 8). The driver 40 is slidable but non-rotatable in an axial opening 41 (Fig. 1) in the work spindle 33 and may be projected into the work or withdrawn therefrom by a rod or plunger 42. When the driver projected outward, as shown in dotted lines in Fig. 8, a cross bar or plate 43 on the driver 40 is moved into the interior of the piston, where it engages inward projections of the piston casting and by which engagement the piston is rotated.

The parts thus far described are substantially as shown in a prior application of Smith and Schinkez, Serial No. 240,042, filed December 14, 1927 and no invention is claimed therein in this application.

Our present invention relates particularly to means for feeding pistons or other work to a position between the centers 31 and 33, and for removing the finished work therefrom. For this purpose we provide a storage for unfinished parts, mechanism for removing a finished piece of work and for inserting a new piece of work in place thereof, and a delivery stand or runway on which the finished work is deposited.

*Supply storage and feeding runway*

The supply of unfinished parts is supported on runways or guides 45 (Figs. 1 and 2) secured at their lower ends to a fixed cross bar 46 and inclined at such an angle that cylindrical parts will roll by gravity toward position for engagement by the feeding grippers. The outer ends of the runways 45 are suitably supported by means not shown. Additional guideways 47 are supported at one end on the cross bar 46 and at the other end on a second cross bar 48, said guideways 47 being provided with up-turned end portions 49 against which a released cylindrical part W will come to rest.

Latches or retarding members 50 (Fig. 2) are clamped on a cross bar 52 pivoted in the guideways 47. One of the members 50 is connected by a link 53 to a bell crank lever 54 (Fig. 1) pivoted at 55 on one of the guideways 47, and having a shoulder engaged by a rod or plunger 56 slidable transversely in the fixed frame 57 of the supply storage mechanism.

The opposite end of the rod 56 is engaged by a lever 58 (Fig. 1) pivoted at 59 and so positioned that the outer end of the lever would be engaged by a stud 60 on the tool carriage 35 as the carriage is moved axially of the lathe. The screw 60 may be adjusted to determine the exact axial position of the carriage 35 when contact is made with the lever 58. Such contact depresses the latches or retarding members 50, permitting an unfinished part W to roll down to the dotted line position indicated at W' in Fig. 2.

When the latch 50 is rocked to release one piston, the rearwardly projecting end portions 61 of the latch members will be raised as indicated in dotted lines in Fig. 2, so that only a single part W will be permitted to roll down against the up-turned ends 49 of the guideways 47.

*Delivery stand*

After the work is finished, it is removed from the centers of the lathe and is elevated and deposited on a delivery stand or runway 63 (Figs. 19 and 20). A cross rod 64 is fixed adjacent the runway 63 and fingers 65 are clamped thereto at such an angle as to conveniently receive the piece of finished work $W^2$ deposited thereon and to guide them to the entrance end of the delivery runway, the fingers 65 being angularly adjustable around the fixed rod 64.

*Gripping mechanism*

We have provided two pair of gripping members, each pair being mounted upon a separate supporting arm or holder, and one pair being utilized to feed the unfinished parts W' to working position, while the second pair is employed in removing the finished parts $W^2$ and presenting them in delivery position.

The work-feeding gripping device comprises a pair of work-engaging grippers 66 (Fig. 9) pivoted at 67 to the lower end of a feeding gripper holder 68. The grippers 66 are preferably forked, as indicated in Fig. 10, and a work-positioning bracket 69 projects rearward therefrom, thus determining the axial position of the unfinished part W'.

The grippers $66^a$ (Fig. 11) pivoted to the delivery gripper holder 70 are of precisely similar construction, but the bracket 69 is replaced by a frame member 71 extending rearward from the holder 70 and having a latch 72 yieldingly mounted therein and adapted to engage in one of the grooves 73 of a finished piston $W^2$.

The inner, adjacent ends 74 (Fig. 9) of the grippers 66 are notched to receive the head 75 of a plunger 76, slidable in an axial opening in the gripper holder 68. A spring 77 holds the plunger 76 normally in outward position, with the grippers open. A rod 78 is secured to the plunger 76 and is slidably mounted in the holder 68 providing positive means for moving the grippers to closed or operative position. The rod 78 has a hook 79 at its upper end for a purpose to be described. The delivery grippers are similarly controlled by a rod $78^a$ and hook $79^a$ (Fig. 14).

Gripper support and actuating mechanism therefor

The gripper holders 68 and 70 extend upward and are pivoted on studs 80 and 80ª (Fig. 4) fixed in a vertically movable supporting frame member 81. Guide-rods 82 (Figs. 5 and 6) are fixed to the frame member 81 for guiding the vertical movement thereof.

The gripper holder 68 is provided with a guide-roll or stud 83, positioned within an inverted U-shaped cam groove 84 (Fig. 16) in a cam plate 85 mounted in fixed position on the machine frame.

The cam roll or stud 83 also extends through a slot or notch 86 (Fig. 7) formed in the end of an arm 87, rotatable with a stud or short shaft 88 to which is secured a pinion 89.

Rack teeth 90 on a rack bar 91 (Fig. 7) engage the pinion 89 and partially rotate the arm 87 as the rack teeth move vertically. The rack bar 91 is formed at the upper end of a rod 92 having a link 93 pivoted thereto and extending downward to a bell crank 94 (Fig. 25) mounted on a fixed pivot 95 and having its second arm 96 positioned in a notch 97 in a plunger 98.

The opposite end of the plunger 98 has a pin and slot connection with a swinging arm 99 carrying a roll 100 positioned in a cam groove 101 in a continuously rotating cam 102. As the cam rotates, the link 93 is periodically moved to reciprocate the rack bar 91 (Fig. 7) and partially rotate the pinion 89 in one direction or the other. The rack teeth 90 are clear of the pinion 89 at the extreme upper and lower limits of travel of the rack bar 91.

At the upper limit of travel of the rack bar 91, the slotted arm 87 is brought into engagement with the left hand side of a stop 103 (Fig. 7) and is held securely in this position by the engagement of a collar 104 (Fig. 7) on the rod 92 with one of the teeth of the pinion 89. The collar is yieldingly supported by a spring 105 and is thus permitted to yield when the pinion is engaged but exerts sufficient pressure thereon to prevent any reverse movement thereof before re-engagement by the rack teeth.

As the arm 87 rotates, the stud or roll 83 in the gripper holder 68 is forced to follow the cam groove 84 in the fixed cam plate 85 (Fig. 16). This causes a substantial upward movement of the supporting frame member 81, carrying the pivots 80 and 80ª of the gripper holders to the positions indicated in Fig. 15.

The operation of the slotted arm 87, in combination with the roll or stud 83 and cam groove 84, is such that the grippers are first raised from the initial positions shown in Fig. 12 to the positions shown in Fig. 15, after which the stud or roll 83 follows the horizontal and descending portions of the cam groove 84 and the grippers are swung to the right and thereafter lowered to the positions shown in Fig. 19, in which positions the centers may be positioned in the unfinished piece of work W', and the finished work W² may be discharged.

Delivery gripper operating mechanism

The delivery gripper holder 70 (Fig. 7) is provided with a cam roll or stud 108 movable in a cam groove 109 formed adjacent the fixed cam plate 85 previously described. Movement is communicated from the feeding gripper holder 68 to the delivery gripper holder 70 by an arm or lever 110 (Figs. 15 and 17) which is mounted on a stud 111 pivoted in the cam plate 85 (Fig. 16) and which has a stud-engaging member 112 pivoted at the lower end thereof. The member 112 has an offset lug 113 (Fig. 18) resting on top of the fixed plate 85.

The pivot stud 111 which is fixed in the arm 110 extends freely through the plate 85 and a coil spring 114 (Fig. 13) is fixed at one end to the stud 111 and at the opposite end to the frame 85, acting to yieldingly swing the arm 110 toward the left as viewed in Fig. 12.

As the stud or roll 83 enters the horizontal upper portion of the cam groove 84 (Fig. 15), it engages the end of the member 112 and forces the arm 110 to the right, causing the same to engage the stud 108 on the delivery gripper holder 70 and moving the stud 108 to the position indicated in dotted lines in Fig. 15.

During this movement, the holder 70 is held elevated by the fact that its pivot 80ª (Fig. 4) is in the same vertically movable supporting frame member 81 as the pivot 80 of the feeding gripper holder 68. The support 81 and both gripper holders are held elevated so long as the stud or roll 83 is in the horizontal upper portion of the cam groove 84.

When the supporting frame member 81 thereafter descends, the stud or roll 108 travels downward to the position indicated in Fig. 19, and the grippers 66ª move to the delivery position also indicated in Fig. 19.

As soon as the cam stud 83 begins to descend the right hand portion of the cam groove 84, the member 112 (Fig. 19) is released and is returned to its initial position by the spring 114 (Fig. 13).

After release of the work by the grippers, as will be hereinafter described, the pinion 89 is rotated in the reverse direction, causing the grippers to retrace their movements to the normal inoperative intermediate position indicated in Fig. 24 where they are held by a dwell in the cam 102 until the work is finished. They are then depressed to the position shown in Fig. 12, after a piece of work W (Fig. 2) has been advanced to feeding position as indicated at W'.

Gripper locking mechanism

Special mechanism is provided for opening and closing the grippers, which mechanism will now be described.

As previously stated, the grippers 66 and 66a are controlled by plungers 76 (Fig. 9) and rods 78 or 78a having hooks 79 or 79a at their upper ends as indicated in Fig. 14. A locking lever 120 (Fig. 14) is pivoted on a stud 121 on the swinging gripper holder 68 and is provided with a shoulder 122 engaging the hook 79 controlling the feeding grippers 66. An extension 123 of the lever 120 is engaged by a cam plate 124 pivoted on the stud 80 about which the holder 68 swings. The cam plate 124 is provided with two projecting lugs 125 and 126.

Similarly, the hook 79a controlling the delivery grippers 66a is engaged by a locking lever 130 pivoted at 131 on the delivery gripper holder 70 and having a shoulder 132 engaging the hook 79a and an arm 133 engaged by a cam plate 134 pivoted on the stud 80a about which the holder 70 swings.

The cam plates 124 and 134 are actuated by plungers 127 and 137 (Fig. 7) having slots or openings 138 (Fig. 22) in their rear faces. A rocking lever 140 (Fig. 22) is mounted on a fixed pivot 141 and is engaged by a latch 142 pivoted at the upper end of an extension 143 of the rack bar 91. As the rack bar descends, the weighted end 142a of the latch 142 engages a stop screw 144 mounted on the lathe adjacent the frame member 81, which swings the latch on its pivot, so that it engages the end of the lever 140 and depresses the same.

The opposite end of the lever, projecting into the slot 138 of the plunger 137, moves the same upward as indicated in Fig. 21. The lever 140 also carries a tooth 145 (Fig. 22) projecting into a notch 146 in the end of a second lever 147 mounted on a fixed pivot 148 (Fig. 23) and having its free end extending into the slot 138 of the plunger 127. Movement of the lever 140 thus causes movement of both plungers 127 and 137, but in opposite directions.

As the grippers are moved downward from the position shown in Fig. 24 to that shown in Fig. 12 to engage the work after the completion of a piece the rack bar 91 approaches its upper limit of travel, and a shoulder 150 thereon engages the under side of the lever 140, (Fig. 22) moving it upward to the position therein shown. Such movement causes the plunger 127 (Fig. 14) to move upward and the plunger 137 to move downward.

These movements of the plungers 127 and 137 rock the cam plates 124 and 134 to the positions indicated in Fig. 14, forcing the extensions 123 and 133 outward, rocking the locking lever 120 and 130, and raising the gripper plungers 78 and 78a and thereby closing and locking the grippers 66 and 66a against the unfinished work W' and the finished work W² (Fig. 12).

The cam plates 124 and 134 remain in locking position while the grippers are raised and swing to the delivery positions indicated in Fig. 19. At this point, the rack bar 91 approaches its lower limit of travel and the pawl 142 (Fig. 22) engages the upper face of the lever 140, depressing the lever and causing downward movement of the plunger 127 and upward movement of the plunger 137, as indicated in Fig. 21.

The swinging movement of the grippers to delivery position has caused corresponding movement of the cam plates 124 and 134, so that downward movement of the plunger 127 and upward movement of the plunger 137 will rock the cam plates in the opposite direction to release the locking levers 120 and 130, permitting the springs 77 (Fig. 9) to open the grippers and release the work.

In Fig. 25, we have indicated the relation of the operating parts corresponding to the extreme upward movement of the rack bar 91 which causes the grippers to engage and grip the work by movement of the gripper operating mechanism to the position shown in Fig. 14.

In Fig. 26, the parts are shown in the position in which the rack bar is partially depressed and the grippers have been elevated toward the position shown in Fig. 15.

In Fig. 27, the parts are shown in the position in which the rack bar is depressed to its fullest extent, causing the latch 42 to engage the lever 140 as shown in Fig. 22, and causing movement of the gripper operating mechanism as indicated by the arrows in Fig. 21 to unlock and release the grippers. It will be noted that the cam groove 101 in the cam 102 is provided with short offset portions 101a and 101b effective to cause the final upward and downward movement of the rack bar 91, such movements being of very brief duration and solely for the purpose of locking and releasing the grippers. Concentric cam groove portions 101c and 101d hold the grippers in open and closed positions.

General operation

Having described the details of construction of our improved work feeding and removing mechanism, it is believed that the general operation will be readily understood.

During the normal operation of the machine, the grippers are substantially in the raised position indicated in Fig. 24, with the grippers open. Upon completion of the work, the cam 102 operates through the rack bar 91 to move the parts to the position indicated in Fig. 12 and the extreme upward movement of the rack bar after the rack teeth are disengaged locks the feeding grippers 66 about the new or unfinished work W' and locks the delivery grippers 66ª about the finished work W².

The rack bar 91 is thereafter moved downward, rotating the arm 87 (Fig. 7) and causing the roll or stud 83 to follow the cam groove 84, raising the grippers simultaneously to the position indicated in Fig. 15.

Further downward movement of the rack bar 91 swings the feeding grippers 66 to the right and by engagement with the member 112 (Fig. 15) causes corresponding movement of the delivery grippers 66ª to the right. Still further downward movement of the rack bar 91 lowers the feeding grippers 66 to the position shown in Fig. 19, and swings the delivery grippers 66ª to the extreme right hand delivery position indicated in the same figure.

Final downward movement of the rack bar 91 after disengaging the pinion 89 causes the latch 142 (Fig. 22) to engage the lever 140 and release the grippers. The rack bar 91 then moves upward to return the grippers to the inoperative position shown in Fig. 24, in which position they remain during the machine operations on the work.

It will be seen that the work is inserted by a substantially vertical downward movement and that it is removed by a substantially vertical upward movement, thus permitting the work to be placed between centers in a lathe or similar machine without interfering with the operation of tools, either at the front and the rear of the work. This is a matter of very great importance, as it is now customary in many automatic machines to operate on both sides of the work at once, and as far as we are advised no feeding mechanism has been heretofore designed capable of inserting the work in such machines while the front and rear tools both remain substantially in operative position.

Furthermore the work is delivered at a higher elevation than the working position, so that it may be fed to a succeeding machine if so desired, which is also a matter of great importance in carrying out a succession of machine processes on the same piece of work.

In handling long work, it will be understood that additional pairs of grippers may be provided, constructed and operated as herein described.

Having thus described our invention and the advantages thereof, we do not wish to be limited to the details herein disclosed, otherwise than as set forth in the claims, but what we claim is:—

1. In a machine tool, a work supply station, an operating station for the work, and a tool station therebetween, means to rotatably support the work in operative position, and means to present the work to operative position comprising a member engageable with the work and mounted to swing through successive upward, lateral and downward movements transversely of the machine thereby to move the work from the supply station over the tool station into the operating station.

2. In a machine tool, a work delivery station, an operating station for the work, and a tool station therebetween, means to rotatably support the work in operative position, and means to remove the work from operative position comprising a member engageable with the work and mounted to swing through successive upward and laterally swinging movements transversely of the machine to delivery position, thereby to remove the work from the operating station over the tool station into the delivery station.

3. In a machine tool, a work supply station, an operating station for the work, and a tool station therebetween, means to rotatably support the work in operative position, means to present said work to operative position comprising a member engageable with the work and mounted to swing through successive upward, lateral and downward movements transversly of the machine thereby to move the work from the supply station over the tool station into the operating station, a delivery station, and a tool station between said operating and delivery stations, and means to remove the work from operative position by successive upward and laterally swinging movements to delivery position, thereby to remove said work from the operating station over said latter tool station into the delivery station.

4. In a machine tool, a work supply station including a work supply device, an operating station for the work and a tool station therebetween, means to rotatably support the work in operative position, means to successively release single pieces of work for advancement to feeding position, means mounted to grasp each such single work piece and swing same upward laterally and downwardly, transversely of the machine thereby to carry the work over the tool station and present it positively in operative position for rotation, and means to grasp and positively remove said work piece after completion of the machine operations thereon.

5. In a machine tool, a work supply station, an operating station for the work, and a tool station therebetween, means to rotatably support the work in operative position, means to positively grip the work, means to swing said work through successive upward lateral and downward movements transversely of the machine thus carrying the work over the tool station, and means to release said work in operative position.

6. In a machine tool, a work delivery station, an operating station for the work, and a tool station therebetween, means to rotatably support the work in operative position, means to positively grip said work when completed, means to swing said work through upward and lateral movements transversely of the machine, from such position, past the tool station to the delivery station, and means to release said work.

7. In a machine tool, a work delivery station, an operating station for the work, and a tool station therebetween, means to rotatably support the work in operative position, means to grip said work, means mounted for movement transversely of the machine and effective to move said work positively past said tool station to an elevated and laterally offset delivery position, and means to release said work.

8. In a machine tool, a work supply station including a work supply device, an operating station for the work and a tool station therebetween, means to rotatably support the work in operative position, a pair of grippers, means to close said grippers on the work and to hold said grippers closed, means to move said grippers through a succession of upward lateral and downward movements transversely of the machine, thereby to move said work past the tool station to operative position, and means to open said grippers.

9. In a machine tool, a work supply station including a work supply device, an operating station for the work and a tool station therebetween, means to rotatably support the work in operative position, a pair of grippers, means to close said grippers on the work and to hold said grippers closed, means to move said grippers and work to operative position, said last named means being mounted to swing transversely of the machine through successive upward lateral and downward movements, thereby to clear said tool station, and means to open said grippers and thereafter remove said grippers from operative position.

10. In a machine tool, means to rotatably support the work in operative position, a pair of feeding grippers mounted to transfer the work from a source of supply to its operative position in the machine, a pair of delivery grippers mounted to transfer said work from operative position to a receiving station, and means to operate said grippers to remove finished work and to insert the unfinished work by related movements, in which said feeding grippers feed one work piece while said delivery grippers remove a finished work piece.

11. In a machine tool, means to rotatably support the work in operative position, a pair of feeding grippers mounted to transfer the work from a source of supply to its operative position in the machine, a pair of delivery grippers mounted to transfer said work from operative position to a receiving station, and means to operate said grippers to remove finished work and to insert the unfinished work by substantially simultaneous movements, in which said feeding grippers feed one work piece while said delivery grippers remove a finished work piece.

12. In a machine tool, means to rotatably support the work in operative position, a pair of feeding grippers mounted to transfer the work from a source of supply to its operative position in the machine, a pair of delivery grippers mounted to transfer said work from operative position to a receiving station, and a single means effective to close both pairs of grippers on unfinished and finished work respectively.

13. In a machine tool, means to rotatably support the work in operative position, a pair of feeding grippers mounted to transfer the work from a source of supply to its operative position in the machine, a pair of delivery grippers mounted to transfer said work from operative position to a receiving position, and a single means effective to close both pair of grippers on unfinished and finished work respectively and to lock said grippers thereon.

14. In a machine tool, means to rotatably support the work in operative position, a pair of feeding grippers mounted to transfer the work from a source of supply to its operative position in the machine, a pair of delivery grippers mounted to transfer said work from operative position to a receiving position, means to close said grippers, means to raise, swing and thereafter depress said grippers relative to the operative position of the work, and means to release said grippers.

15. In a machine tool, means to rotatably support the work in operative position, a pair of feeding grippers mounted to transfer the work from a source of supply to its operative position in the machine, a pair of delivery grippers mounted to transfer said work from operative position to a receiving position, means to close said grippers, means to raise, swing and thereafter depress said grippers, relative to the operative position of the work, and means to release said grippers, said delivery grippers being moved laterally by said feeding grippers.

16. In a machine tool, a work delivery station, an operating station for the work, and a tool station therebetween, means to feed the work, means to rotatably support the work in operative position, and means to remove the work from operative position comprising a member engageable with the work and mounted to swing through successive upwardly and laterally swinging movements transversely of the machine to delivery position, thereby clearing said tool station, the final operative movement of the feeding means and the initial operative movement of the delivery means being substantially vertical.

17. In a machine tool, means to feed the work, means to rotatably support the work in operative position, and means to remove the work from operative position comprising a member engageable with the work and mounted to swing through successive upward and laterally swinging movements transversely of the machine to delivery position, said feeding and delivery means being held at rest in an intermediate raised position during the machine operations on the work.

18. In a machine tool, means to rotatably support the work in operative position, means to present said work to operative position comprising a member engageable with the work and mounted to swing through successive upward, lateral and downward movements transversely of the machine, and means including a cam path to control said movements, said member having a portion movable along said path.

19. In a machine tool, means to rotatably support the work in operative position, means to present said work to operative position comprising a member engageable with the work and mounted to swing through successive upward, lateral and downward movements transversely of the machine, and a substantially U-shaped inverted fixed cam effective to control said movements.

20. In a machine tool, means to rotatably support the work in operative position, means to move the work relative to its operative position, comprising means to positively grip a piece of work, means to raise and lower said gripping means, and means including a cam path and a portion of said gripping means movable therealong and effective to swing the said work laterally and to direct said raising and lowering movements.

21. In a machine tool, means to rotatably support the work in operative position, means to support additional pieces of unfinished work in storage, a tool station operatively between said storage means and said work supporting means and automatic feeding means effective to advance a piece of work from storage to operating position, said feeding means being mounted for both lateral and downward movement as it advances the work thereby to clear said tool station.

22. In a machine tool, means to rotatably support the work in operative position, means to support additional pieces of unfinshed work in storage, a tool station operatively between said storage means and said work supporting means, and means to advance a piece of work from storage to operating position by successive rearward and downward feeding movements transversely of the machine thereby to clear said tool station.

In testimony whereof we have hereunto affixed our signatures.

EDWIN R. SMITH.
ALBERT SCHINKEZ.